UNITED STATES PATENT OFFICE.

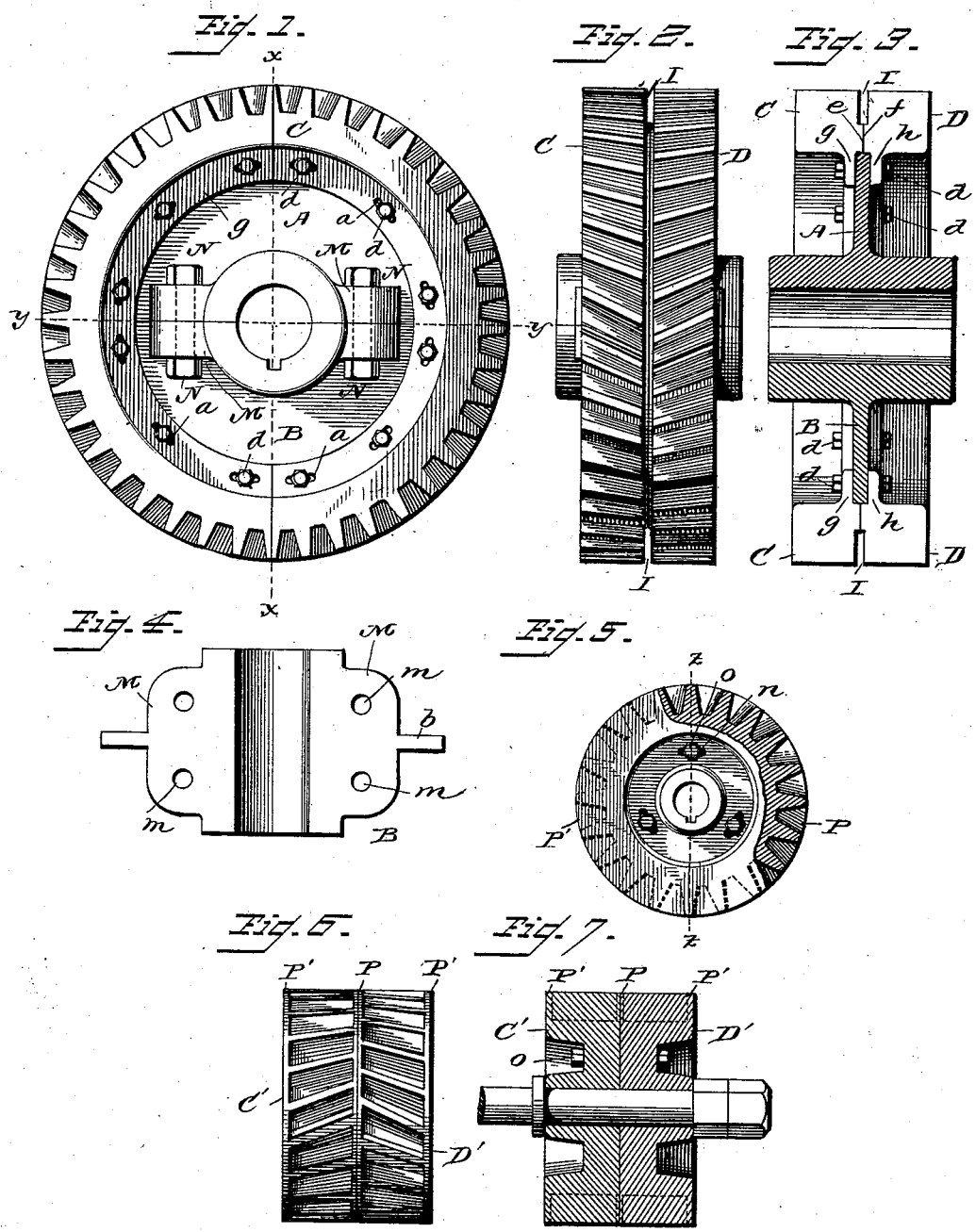

WILLIAM JOSLIN, OF CLEVELAND, OHIO.

GEARING.

SPECIFICATION forming part of Letters Patent No. 415,044, dated November 12, 1889.

Application filed August 6, 1889. Serial No. 319,923. (No model.)

*To all whom it may concern:*

Be it known that I, WILLIAM JOSLIN, a citizen of the United States, residing at Cleveland, in the county of Cuyahoga and State of Ohio, have invented certain new and useful Improvements in Gearing; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to gearing and aims to prevent backlash and obtain a gear-wheel that will run smoothly and noiselessly.

The improvement consists in the novel features which hereinafter will be more fully described and claimed, and which are shown in the annexed drawings, in which—

Figure 1 is a side view of a gear-wheel embodying my invention. Fig. 2 is an edge view of the gear-wheel. Fig. 3 is a section on the line $x$ $x$ of Fig. 1; Fig. 4, a section on the line $y$ $y$ of Fig. 1, the toothed rim being removed. Fig. 5 is a side view of a pinion constructed in accordance with the spirit of my invention. Fig. 6 is an edge view of the pinion. Fig. 7 is a section of the pinion on the line $z$ $z$ of Fig. 5.

The gear-wheel is composed of a central portion, which comprises the two halves A and B, counterparts of each other, and the sectional toothed rims C and D, which are screwed to the center piece by suitable fastenings, as the bolts $d$, which pass through the rims and the web $b$ of the center piece. Each of the toothed rims is composed of a plurality of sections, the number varying according to the size of the wheel, but generally not exceeding two sections, which are placed to overlap the joint between the halves A and B of the center piece. One or both of the rims may have slots $a$, through which the bolts $d$ pass, so that one rim may be adjusted independently of the other rim to prevent backlash. The lateral annular flanges $e$ and $f$ on the opposing sides of the toothed rims, abutting, space the teeth of each rim apart, as shown at I, for the purpose hereinafter to be described. The inner flanges $g$ and $h$ overlap the sides of the center web $b$ and receive the bolts $d$. The web $b$, fitting in the angle between the flanges $e$ and $g$ and $f$ and $h$, strengthens the rims. Each half of the center piece has lateral wing-extensions M, which project an equal distance on each side of the plane of the web portion $b$, and which have bolt-openings $m$, through which bolts N pass and secure the halves together.

The pinion is composed of two halves C' and D', which are secured together by the bolts O, which pass through openings in each half. The openings, as $n$, in one-half are elongated to form a slot, so that one-half can be adjusted independently of the other.

The teeth are preferably inclined to the axis of the wheel, and the teeth on one rim incline in an opposite direction to the teeth on the other rim and are arranged so that the teeth on one rim come opposite the spaces between the teeth of the other rim. The pinion has a central flange P to correspond with the space I of the gear-wheel, and end or side flanges P' P' to overlap the sides of the gear-wheel.

What I claim, and desire to secure by Letters Patent of the United States, is—

1. A gear-wheel composed of a center formed of two parts bolted together and having a web portion, and toothed rim-sections breaking joints with and secured to the web of the center, substantially as described.

2. The combination, with the gear-wheel comprising two independent toothed rim-sections which are relatively adjustable and which have an annular space between them, of a pinion having correspondingly-adjustable toothed rim-sections, and an annular flange between the said toothed rim-sections which corresponds with the annular space between the adjustable toothed rim-sections of the said gear-wheel, substantially as and for the purpose described.

3. The combination, with the center, of the two toothed rim-sections having lateral flanges between their opposing sides which form a space, and having inner flanges which are bolted to the sides of the said center, substantially as described.

In testimony whereof I affix my signature in presence of two witnesses.

WILLIAM JOSLIN.

Witnesses:
   S. A. TERRY,
   WILL MUIRHEAD.